United States Patent Office 3,515,871
Patented June 2, 1970

1

3,515,871
RADIOACTIVE BOREHOLE LOGGING METHOD AND APPARATUS WHEREBY ELEMENTS OF INTEREST ARE DETERMINED BY GENERATING GAMMA RAYS HAVING A PREDETERMINED CRITICAL ENERGY SUCH THAT THEY ARE RESONANTLY SCATTERED BY SAID ELEMENTS
Walter H. Johnson, Jr., Cambridge, Mass., and William C. Pritchett, Dallas, Tex., assignors to Atlantic Richfield Company, Philadelphia, Pa., a corporation of Pennsylvania
Continuation-in-part of application Ser. No. 591,543, Nov. 2, 1966. This application Dec. 21, 1966, Ser. No. 603,493
Int. Cl. G01t *1/202;* G01j *5/00*
U.S. Cl. 250—71.5                                5 Claims

ABSTRACT OF THE DISCLOSURE

A radioactive logging method and apparatus for quantitatively determining an element of interest in subsurface formations traversed by a borehole. Earth formations are bombarded with gamma rays having a predetermined critical energy such that they are capable of being resonantly scattered by said element of interest. These gamma rays are produced by generating a flux of low energy neutrons, moderating the neutrons to thermal energies, and bombarding special neutron capture material.

---

The application is a continuation-in-part of application Ser. No. 591,543, filed Nov. 2, 1966.

The present invention relates to a new radioactive logging technique for elemental analysis. More particularly, the invention concerns nuclear resonant scattering of gamma rays as selective means for determining an element of interest in a subsurface formation penetrated by a borehole.

A nucleus may contain only discrete amounts of energy and is thus said to exist in one of several possible energy states or levels. When the nucleus absorbs a neutron, it becomes excited and occupies a higher energy state. The nucleus may then decay to the ground state in a single energy transition or in a cascade of transitions through successively lower energy levels. Transitions between various energy states are accompanied by the emission of gamma rays and recoil of the nucleus. Since the energy states are characteristic of a particular nucleus, so also are the gamma rays emitted because of transitions between the energy states.

By the process of nuclear resonant scattering the emitted gamma rays may be absorbed by other nuclei and then re-emitted with essentially the same energy (differing only by the recoil energy of the nucleus). This effect will occur only if the original gamma ray has a particular critical energy dependent upon inherent energy levels of the resonant scatter nucleus. This resonant scattering process is extremely selective, occuring only for gamma rays whose energies fall within a window or energy band of a few electron volts out of several million electron volts.

It is the primary object of the present invention to provide methods and apparatus for determining an element of interest in a subsurface formation by irradiating the formation with monoenergetic gamma rays capable of being resonantly scattered by the element of interest.

2

Other objects will be obvious to those skilled in the art and will in part appear hereinafter.

For a fuller understanding of the invention reference should be made to the accompanying drawings in which.

Figure 1:
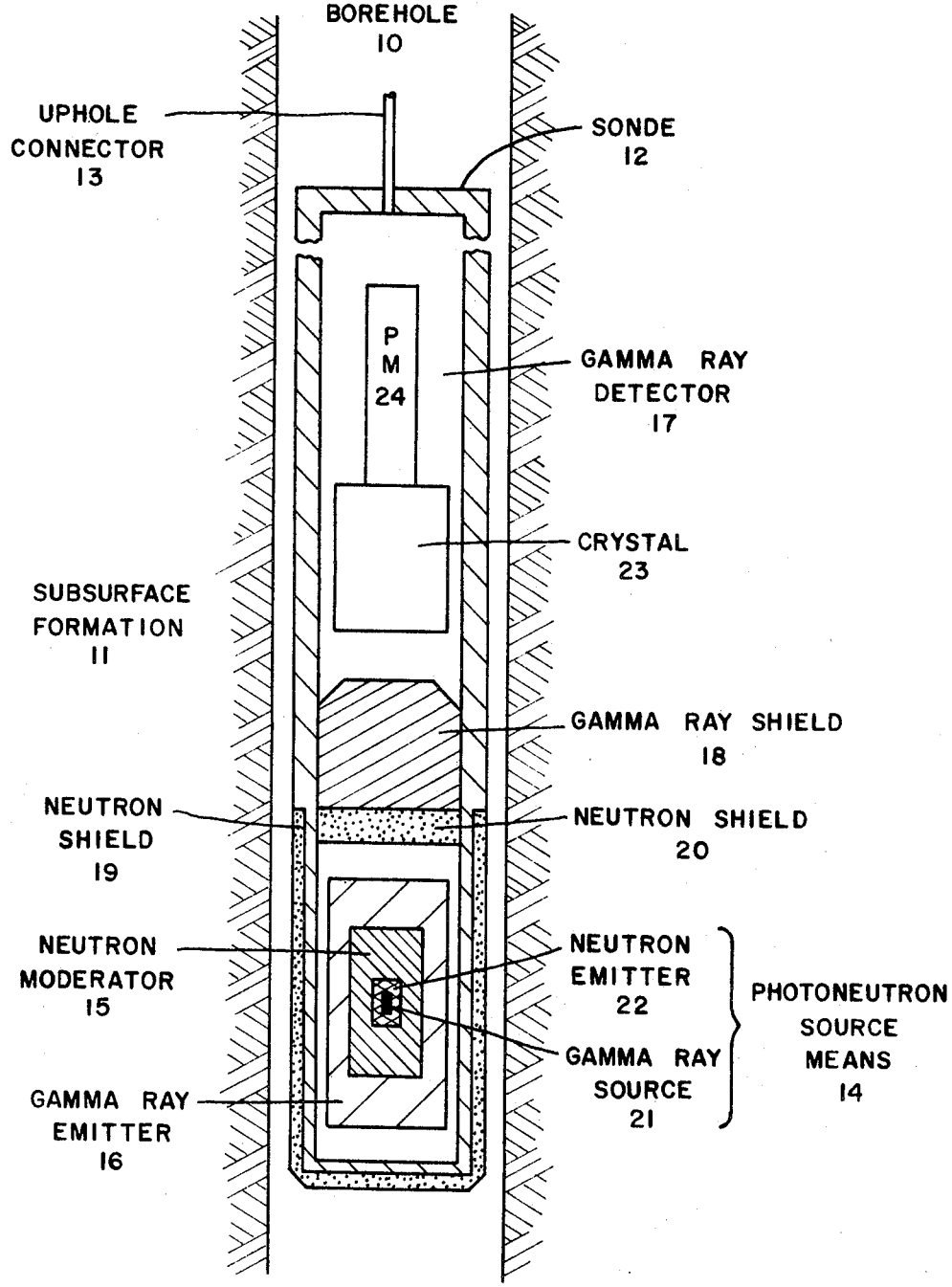
FIG. 1 is a representation in longitudinal section showing a logging tool embodying the invention traversing a borehole.

The basic principles of the invention will be apparent in reference to FIG. 1. Borehole 10 penetrates subsurface formation 11. Logging tool or sonde 12 is adapted to pass through the borehole and is positioned in proximity to formation 11. Sonde 12 is connected to the surface by uphole connector 13 and includes: photoneutron source means 14, neutron moderator 15, gamma ray emitter 16, gamma ray detector 17, gamma ray shield 18, and neutron shields 19 and 20.

Photoneutron source means 14 is comprised of gamma ray source 21 encased in neutron emitter 22. Gamma rays emitted by source 21 exceed in energy the binding energy of neutrons in neutron emitter 22. Accordingly, gamma rays from decay of soruce 21 energize neutron emitter 22 producing a flux of low energy neutrons.

Beryllium and deuterium are preferred photoneutron materials since they have neutrons with exceptionally low binding energies, i.e 1.67 mev. and 2.23 mev., respectively. Beryllium and/or deuterium can be energized to the above levels by a number of radioactive nuclei including antimony (124), yttrium (88), lanthanum (140), radon (226), and thallium (208)[1].

Neutron moderator 15 serves to de-energize or slow down neutrons generated by photoneutron source means 14 to thermal energies, i.e. energies on the order of about 0.025 ev. or less. Materials rich in hydrogen such as plastics are the best neutron moderating materials; preferred among these are polyolefins such as polyethylene and polypropylene.

Gamma ray emitter 16 captures a substantial portion of the thermalized neutrons and gives off characteristic gamma rays of predetermined energy. Proper working of the present invention necessitates that the neutron capture material comprising gamma ray emitter 16 be specially chosen such that gamma rays emitted thereby have a preselected energy which is critical with respect to the element in formation 11 being determined.

Coincidences in nature result in the emission of gamma rays by certain elements with energies such that they can be resonantly scattered by certain other nuclei. It follows that, where monoenergetic gamma rays which are reactive exclusively with an element of interest are introduced into a formation 11, the concentration of the element of interest can be determined by detecting the elastically scattered gamma rays which are returned therefrom.

The table gives a partial listing of particular elements which can be determined by application of the invention and neutron capture materials which are appropriate gamma ray emitters in each case.

---

[1] Since thallium has a fairly short half life, a gamma ray source based thereon would best incorporate some isotope higher in its decay series such as thorium (228) or radon (228).

TABLE

| Element to be determined | Neutron capture material | Emitted gamma ray, mev. | Scatter cross section, mb. |
|---|---|---|---|
| Cl | Fe | 7.285 | 34 |
| Zr | Se | 8.496 | 3,050 |
| Zn | Ni | 8.119 | 13 |
| Cd | Fe | 7.64 | 40 |
| Cd | Co | 6.474 | 110 |
| Tl | Fe | 7.64 | 370 |
| Mo | Cu | 7.634 | 11 |
| Mo | Hg | 6.44 | 25 |
| Te | Ni | 7.528 | 66 |
| Pb | Fe | 7.285 | 4,100 |
| La | Mn | 7.15 | 60 |
| La | Ti | 6.413 | 72 |
| Sn | Cu | 7.01 | 110 |
| Nd | Co | 6.867 | 30 |
| Pt | Hg | 5.99 | 40 |
| Ce | Co | 5.646 | 17 |
| Hg | Co | 4.903 | 385 |

In further reference to FIG. 1, gamma ray detector 17 is comprised of scintillation crystal 23 and photomultiplier 24 optically coupled thereto. Crystal 23 produces scintillations in response to impinging gamma rays and photomultiplier 24 converts the scintillations to electrical pulses. Detector 17 is sensitive to the gamma rays returned from formation 11 and registers gamma rays which have been elastically scattered by the element of interest. Discriminator means (not shown) can be connected to the output of the detector to establish a minimum threshold or window in order to discriminate against spurious pulses such as may be caused by inelastic scattering.

In order that the invention operate as intended, it is essential that a shielding system be employed which will (1) prevent neutrons generated by photoneutron source means 14 from reacting with the formation, inhole well fluids, or components within sonde 12, and (2) keep gamma rays from approaching detector 17 directly from gamma ray emitter 16. Neutron shields 19 and 20 carry out the former function and gamma ray shield 18 performs the latter.

Neutron shield 19 is formed exterior to sonde 12 and surrounds gamma ray emitter 16. An alternate construction (not shown) would be to have shield 19 located within sonde 12, but outside emitter 16 (in some instances both external and internal neutron shields lateral to emitter 16 may be desirable). Neutron shield 20 is positioned above gamma ray emitter 16 so as to prevent neutrons from approaching within the vicinity of detector 17.

Suitable neutron shielding materials include elements such as boron, lithium, gadolinum, etc., which have relatively large neutron capture cross sections and produce few high energy interfering gamma rays. Boron, particularly boron (10), and compounds or alloys thereof are preferred by applicants as neutron shielding materials.

Gamma ray shield 18 is disposed between neutron shield 20 and gamma ray detector 17. Shield 18 attenuates gamma rays derived from emitter 16, gamma rays resulting from neutron captures by shield 20, etc. Gamma ray shielding materials which can be employed are tungsten, tantalum, uranium, bismuth, lead, etc., either present in the elemental form or as various compounds and alloys thereof.

Figure 2:
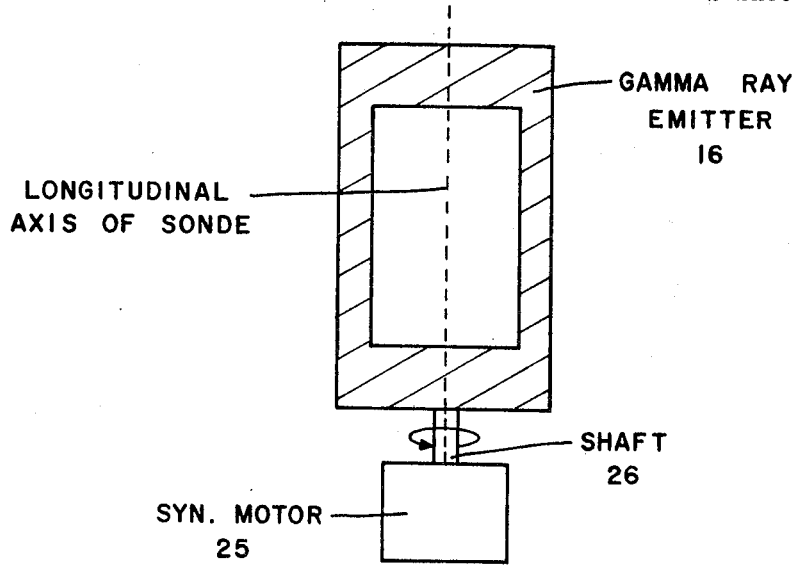
FIG. 2 shows a first modification of the invention wherein the gamma ray emitter is rotated.

Reference is now made to FIG. 2 where synchronous motor 25 is shown connected to gamma ray emitter 16 by rotatable shaft 26. Rapid spinning of emitter 16 about the longitudinal axis of the sonde generally significantly increases the cross section of the scatter reaction by broadening the energy band of the emitted gammas due to Doppler shifting. Rotational rates on the order of 25,000 to 100,000 r.p.m. are suitable for this purpose.

Figure 3:
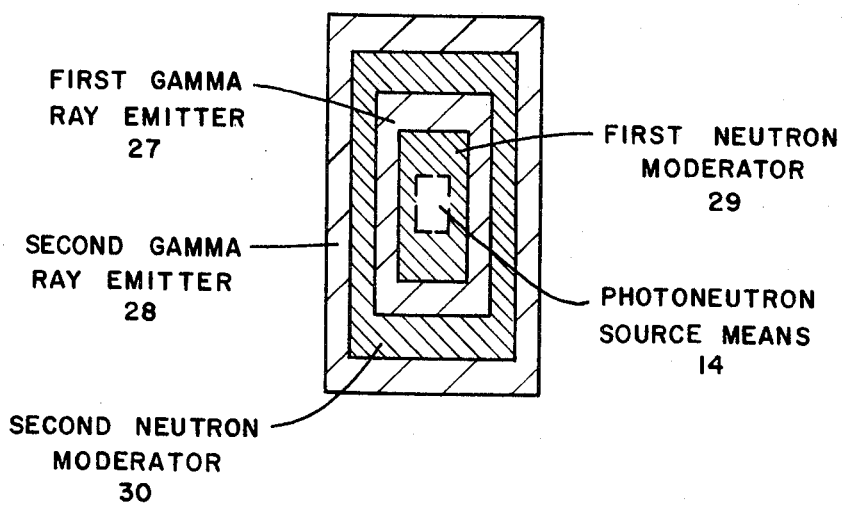
FIG. 3 shows a second modification of the invention wherein there are a plurality of concentrically arranged gamma ray emitters.

FIG. 3 presents an alternate embodiment of the invention wherein there are a plurality of concentrically arranged gamma ray emiters 27 and 28. Neutron moderator 29 separates photoneutron source means 14 and emitter 27 and neutron moderator 30 is sandwiched between emitters 27 and 28. This arrangement increases the probability that a given neutron will be thermalized by the neutron moderating material and captured by the neutron capture material.

An important advantage of the present invention over the resonant scatter logging method disclosed in applicants' parent application is that much greater depth of penetration is achieved. Gamma rays have a much greater range of penetration compared to that of neutrons so that information can be obtained from nuclei at a greater distance from the borehole.

While the invention has been presented in general terms to cover determining any element of interest for which a suitable gamma ray emitter can be found, emphasis should be made that the invention has particular utility as a chlorine logging tool for petroleum exploration.

It is intended that the scope of the invention be limited only by the appended claims after due allowance for equivalents.

What is claimed is:

1. A radioactive logging tool adapted to traverse a borehole comprising
    (a) a photoneutron source means,
    (b) a neutron moderator surrounding said photoneutron source means for de-energizing neutrons generated by said photomultiplier source means,
    (c) a gamma ray emitter composed of a preselected neutron capture material enclosing said neutron moderator for producing gamma rays having a predetermined critical energy,
    (d) a neutron shield at least laterally surrounding said gamma ray emitter to prevent neutrons from escaping outside the tool,
    (e) a gamma ray detector spaced apart from said gamma ray emitter, and
    (f) a gamma ray shield separating said gamma ray emitter and said gamma ray detector for blocking gamma rays approaching said gamma ray detector from the direction of said gamma ray emitter.

2. A logging tool according to claim 1 where said photoneutron source means is comprised of a neutron emitter encasing a gamma ray source adapted to energize said neutron emitter.

3. A logging tool according to claim 1 wherein said gamma ray emitter has means connected thereto for rotating same about the longitudinal axis of said tool.

4. A logging tool according to claim 1 wherein said neutron capture material has means connected thereto for rapidly rotating same.

5. A logging tool according to claim 1 wherein said neutron capture material is iron.

References Cited

UNITED STATES PATENTS

| | | | |
|---|---|---|---|
| 2,206,634 | 7/1940 | Fermi et al. | 250—83.1 X |
| 2,491,320 | 12/1949 | Koontz | 250—83.6 |
| 2,769,915 | 11/1956 | Tittle | 250—71.5 |
| 2,967,937 | 1/1961 | McKay | 250—83.1 |
| 3,094,622 | 6/1963 | Handel | 250—83.3 |
| 3,378,097 | 4/1968 | Straus et al. | |

RALPH G. NILSON, Primary Examiner

M. J. FROME, Assistant Examiner

U.S. Cl. X.R.

250—83.1, 83.6, 84, 106